United States Patent [19]

Lee

[11] Patent Number: 4,692,678
[45] Date of Patent: Sep. 8, 1987

[54] CLOSED LOOP SERVO CONTROL SYSTEM

[76] Inventor: Robert E. Lee, 68 Dean St., Westwood, N.J. 07675

[21] Appl. No.: 916,993

[22] Filed: Oct. 2, 1986

Related U.S. Application Data

[63] Continuation-in-part of Ser. No. 680,137, Dec. 10, 1984, Pat. No. 4,616,153.

[51] Int. Cl.$^4$ ............................................. H02K 41/00
[52] U.S. Cl. ...................................... 318/687; 310/13; 310/27; 318/135
[58] Field of Search .................... 318/687, 135, 35–38; 310/12–14, 27

[56] References Cited

U.S. PATENT DOCUMENTS

| | | | |
|---|---|---|---|
| 3,001,115 | 9/1961 | Gendren et al. | 318/135 UX |
| 4,422,027 | 12/1983 | Mohlere | 318/687 |
| 4,456,934 | 6/1984 | Wedman et al. | 318/687 X |
| 4,590,411 | 5/1986 | Kelly | 318/687 |
| 4,595,870 | 6/1986 | Chitayat | 318/687 |
| 4,616,153 | 10/1986 | Lee | 318/687 |

Primary Examiner—Donovan F. Duggan
Attorney, Agent, or Firm—Melvin K. Silverman

[57] ABSTRACT

The invention relates to a method for controlling a closed loop linear position servo-motor having an armature including a first group of excitation windings and a second group of excitation windings, and a stator including field magnets disposed radially opposite the first winding group, and feedback windings disposed radially opposite the second winding group. The method includes the steps of: applying a positional zero reference to the feedback windings, the zero reference correlating to a nominal zero position of the armature; monitoring time-dependent changes in the electromagnetic coupling between the feedback windings and the second armature winding group, relative to the coupling value of the zero reference; translating the electromagnetic coupling changes into a positional data signal; and reiteratively applying the compensation current to the second winding group to compensate the value of the electromagnetic coupling to positionally regulate the armature in conformance with external program control signals.

9 Claims, 5 Drawing Figures

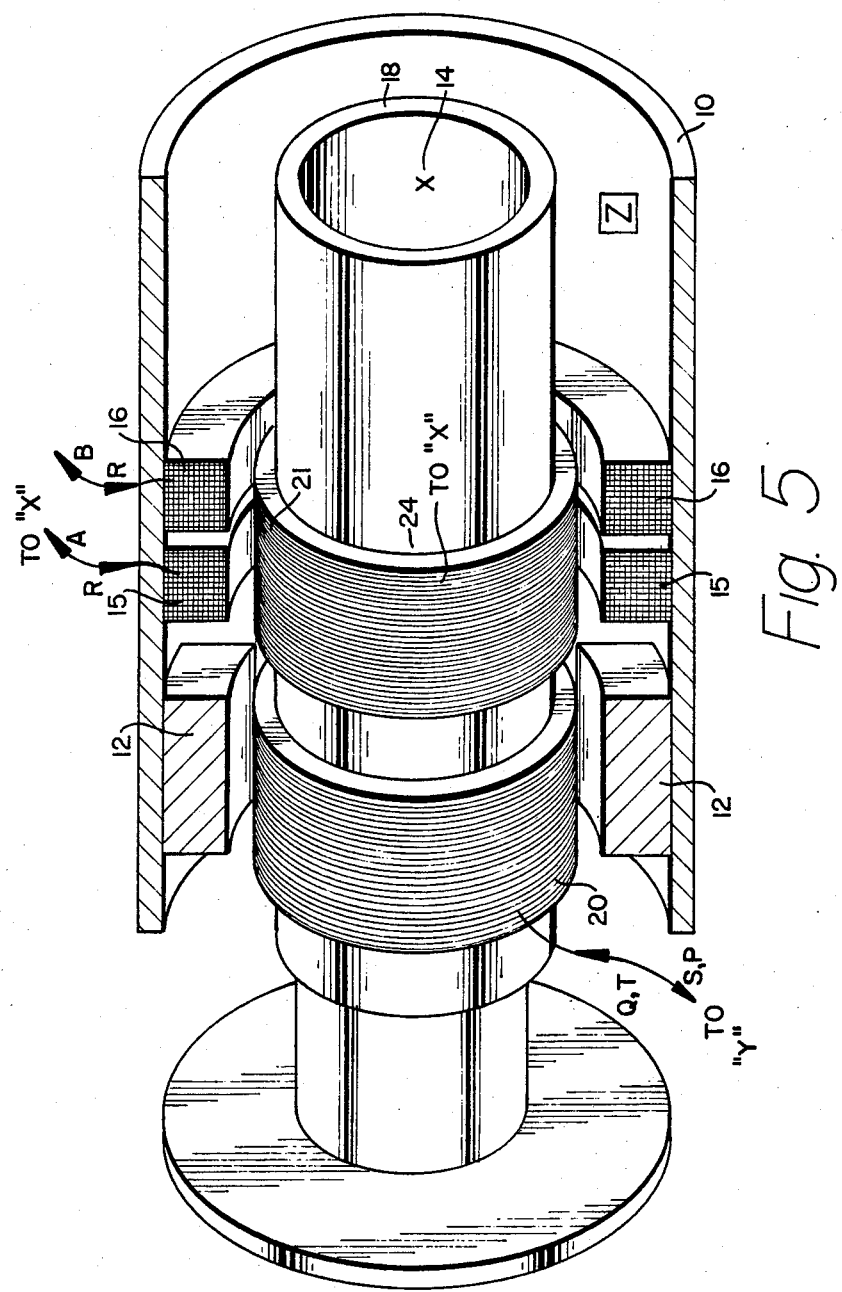

CLOSED LOOP SERVO CONTROL SYSTEM

REFERENCE TO RELATED APPLICATION

The case is a Continuation-in-part of application Ser. No. 680,137, filed Dec. 10, 1984, entitled Closed-Loop Linear Position Servomotor, now U.S. Pat. No. 4,616,153.

BACKGROUND OF THE INVENTION

The ever expanding and large complex array of scientific and engineering problems, requiring a more precise and responsive method for dynamical control and analysis, has defined the requirements for a better method of feedback and control, namely, by processing quadratic variables within the control loops of a new form of micro-computer-driven controller.

The background for such methodology lies in the network and system theories developed by Gabriel Kron whose tensor theory (a generalization of complex number theory), employing mathematical models of circuit networks, provided a ready solution of problems of great variety and immense complexity with the aid of electronic digital computers. These concepts form a part of modern combinatorial topology. However the theories of topological structure, in further development by mathematicians, have nearly lost all traces of their electrical origin and have been disassociated from the original network structure methodology.

In general, major progress in developing better mathematical and/or computer models has led to new theorems and computer algorithms that deal with problems involving variables about curves in a three or more (n) dimensional space. There are two corresponding methods recognized for explaining or mathematically modeling natural and synthesized phenomena extensively. One dealing with continuous variables is called tensor theory or point-set topology. The other dealing with discrete quantities is called combinatorial or algebraic topology. Point set topology underlies calculus, function theory, differential equations, and other methods of dealing with the properties of points infinitesimally distant from one another on curves or along straight lines. Under algebraic topology are included the theory of groups and networks, and other common methods of dealing with distinct entities. The former is especially adapted to deal with problems in high resolution and complex areas, the latter dealing with problems in large, time sensitive areas. However, there is no sharp line separating the two methods, since each overlaps the other, and the same mathematical algorithms available are common to both.

The quad linear motor (QLM), embodied in my U.S. Pat. No. 4,616,153, is a device embodied as a sub-system of a larger system. It is a generalized operational assembly of interconnecting but separable and dependent component parts. Functionally, it is designed as a system to provide linear-squared motion, i.e., both linear function and direction with time, position, direction, velocity and force as variables of motion equations having input constants set to control one or more of the above variables as an output control function, from a micro-computer system, to the motor armature.

The quad-linear motion of the system is a function of point-set topology or tensor calculus applied to a control and feedback scheme, this providing a powerful integration of mathematical models into the control system and expanded degree of accuracy and compound flexibility.

The quad-linear motor and its system is a statement of operational process functions of the parts, both collectively and independently, and including that which is operated on, generally called the input, to produce something generally called the output. The system function is a device procedure or scheme behaving according to computer driven algorithms, fitted to a defined function and operating on information (stored data), inputs and a time reference to yield motion and statistics, as a function of time and input data, as its output.

The system set forth herein is an integrated approach to the synthesis of an entire group of components as an entity, rather than simply as an assembly of individual and independent parts, i.e., a system in which each component is designed to interface properly with other components and a control computer, rather than to function independently. This defines a motor of unique design which cannot operate outside of, or independently of, its control system. However, such an integrated approach provides a linear motor with great flexibility and a high degree of both motion and functional linearity to perform various linear motion related tasks in what is designed to be a most efficient, accurate and adaptive method for producing complex linear motion functions as required in sensitive instruments, optics, lasers, guidance, robotic and medical perfusion technologies.

The QLM is embodied as a dynamical hybrid analog/digital computer system. This adaptive control system exhibits a crude form of learning in its self-adjustment toward an established goal. The hybrid arrangement is indispensable because one of the major problems in using a digital computer in a real-time continuous-data control system, is the time factor for encoding and decoding analog signal paths. The analog computer is also the ideal medium to execute combinatorial quadratic and linear equations in a parallel-processing mode. The digital computer will handle the point-set topology and the linear setpoints of the system.

In this microcomputer-based device, the analog computation follows high frequency variations, while the digital computation periodically corrects for low frequency drift, adjusting feedback parameters in the high frequency loops and establishing the proportional, integral and derivative setpoints of the analog-loop control computer. In the adaptive control sequence the digital computer reiteratively solves multiple-order polynomial, simultaneous and quadratic equations of mathematical process models, as in a nonlinear feedback loop. The ability to customize and optimize these mathematical models or algorithms is paramount to the adaptive control sequence.

The inventor is unaware of prior art having particular pertinence hereto, other than his above-referenced U.S. Pat. No. 4,616,153.

SUMMARY OF THE INVENTION

The invention relates to a method for controlling a closed loop linear position servo-motor having an armature including a first group of excitation windings and a second group of excitation windings, and a stator including field magnets disposed radially opposite said first winding group, and feedback windings disposed radially opposite said second winding group, the method comprising the steps of: applying a positional zero reference to said feedback windings, said zero reference correlating to a nominal zero position of said armature; monitoring time-dependent changes in the electromagnetic coupling between said feedback windings and said second armature winding group, relative to the coupling value of said zero reference; translating said electromagnetic coupling changes into a positional data signal; and reiteratively applying the compensation current to said second winding group to compensate the value of said electromagnetic coupling to thereby positionally regulate said armature in conformance with external command signals.

Contemporaneously with the steps above: applying a reference current to said first armature winding group, said reference current corresponding to an armature coupling reference value and to an armature output force reference value; monitoring time-dependent changes in the electromagnetic coupling between said first armature winding group and said field magnets relative to said referenced coupling value; translating electromagnetic coupling changes monitored above into force data signals; and reiteratively applying a compensation current to said first winding group to thereby compensate the value of said first group armature coupling to regulate the positive and negative force of said armature in conformance with external command signals.

The design objectives and factors to be addressed by the QLM design are as follows:

(1) A motor system dependent on an analog computer's simple but effective high speed differential-equation-solving ability and also exhibiting features essential to all analog designs of dynamical systems, including powerful algorithms employed in electronic analog computation combine repetitive operation with analog memory and hybrid analog/digital automatic programming to permit automatic decisions and iterative subroutines.

(2) A dynamically controlled computer-driven motor having specific blocks of computing elements and an implemented machine equation corresponding to one or several equations such as the Lagrange-Euler equations of motion", typical for each "generalized coordinate" of the dynamical system, the output voltages of these blocks representing generalized displacements and/or velocities.

(3) An input voltage driving each block representative of generalized forces, displacements, velocities and/or accelerations, each such voltage being a function of a computer program, time and/or of the machine variables representing generalized displacements, velocities, frequency and/or time within the prescribed system algorithm.

(4) Processing of coupling forces between any two degrees of freedom appearing as logical interactions between two of the equations of motion, resulting in corresponding electrical interaction through connections between two blocks of computing elements interactively controlling the driving element under feedback control actively or reactively determined by the computer and the analog control interface.

(5) Solution to a disturbed response of a polynominal-driven feedback and control system having "n" controlled variables described as a two or three dimensional array having a phase portrait in a space of at least "2n" dimensions and, in particular, solution of a disturbed response of a second-order feedback control system with only one controlled variable described by means of a phase portrait in the phase plane.

(6) The general solution of vectors, simultaneous quadratic equations, linear transformations and scaler products through rectangular matrices or determinant arrays to solve Routh's criterion, Laplace transforms and Lagrange-Euler equations reiteratively, the solution of these matrices on a real time basis increasing the performance of servo systems several orders of magnitude.

(7) Varying system parameters within reasonable limits and to study the resulting changes in the system performance without halting the operation of, or making radical changes to, the system embodiment.

(8) Establishment of a functional analogy between components of the dynamical motor/system and blocks of computing elements to not only furnish numerical solutions of equations of motion as output data but also provide scientific investigators with intuitive understanding of dynamical subsystems and their real time function as a part of a larger system.

(9) To provide rational designs, given that the dynamical relationship between the input (stimulus) X(t) and the output response Y(t) of many control system components can be represented by a linear equation, and that the correpsonding computer algorithm, relate state changes to forcing functions for each of the system degrees of freedom as defined in the motion equations of a system algorithm.

The above and yet further objects and advantages of the present invention will become apparent from the hereinafter set forth Detailed Description of the Invention, the Drawings, and Claims appended herewith.

BRIEF DESCRIPTION OF THE DRAWINGS

FIG. 5 is a cut-away perspective schematic view showing the radial disposition of the stator pole magnets, showing the air gap between the armature and stator, and showing signal interfaces to motor components.

DETAILED DESCRIPTION OF THE INVENTION

Figure 1:
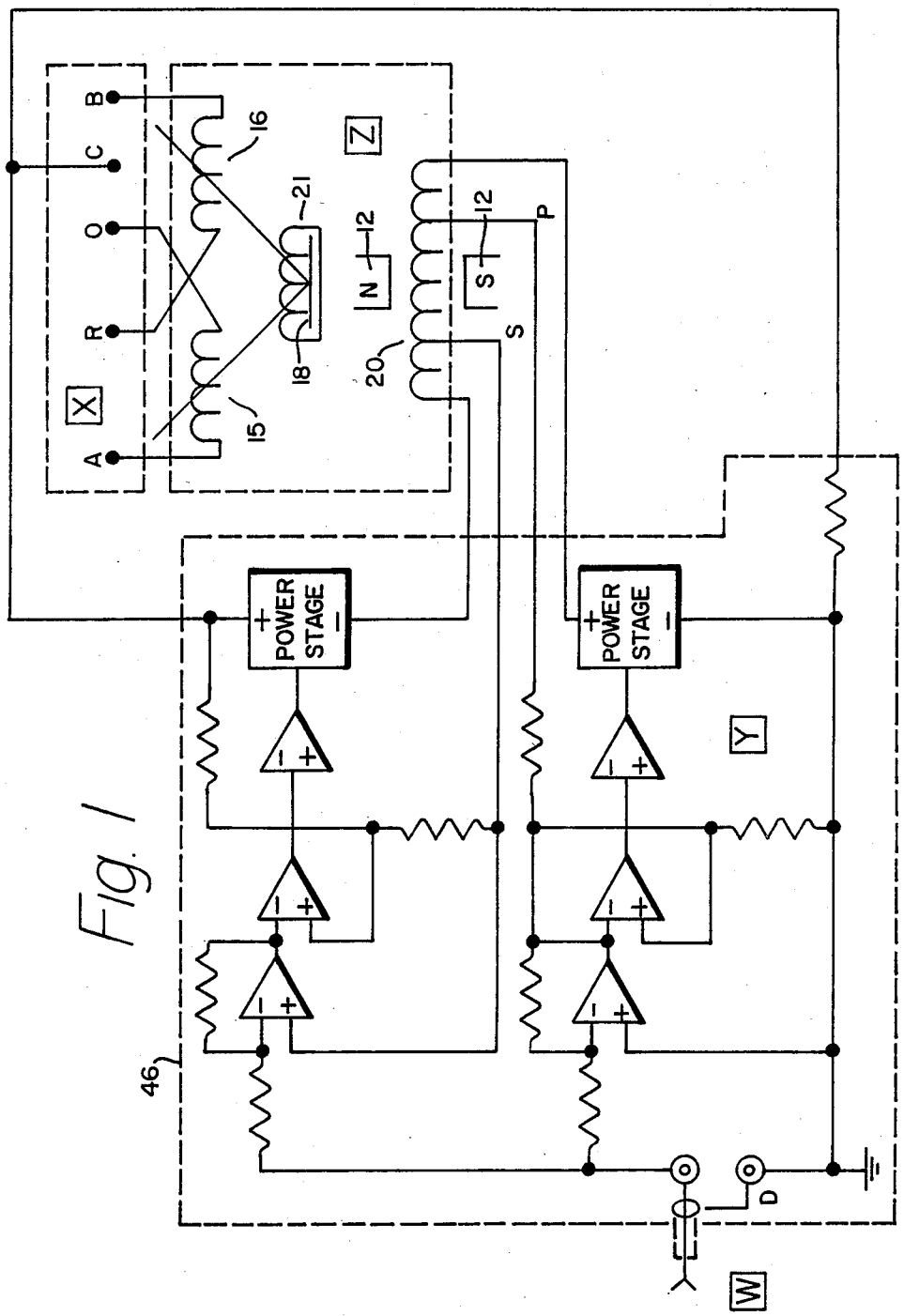
FIG. 1 is an illustration of the servo-amplifier and feedback systems of the present servomotor with relationship to the control system.
Figure 2:
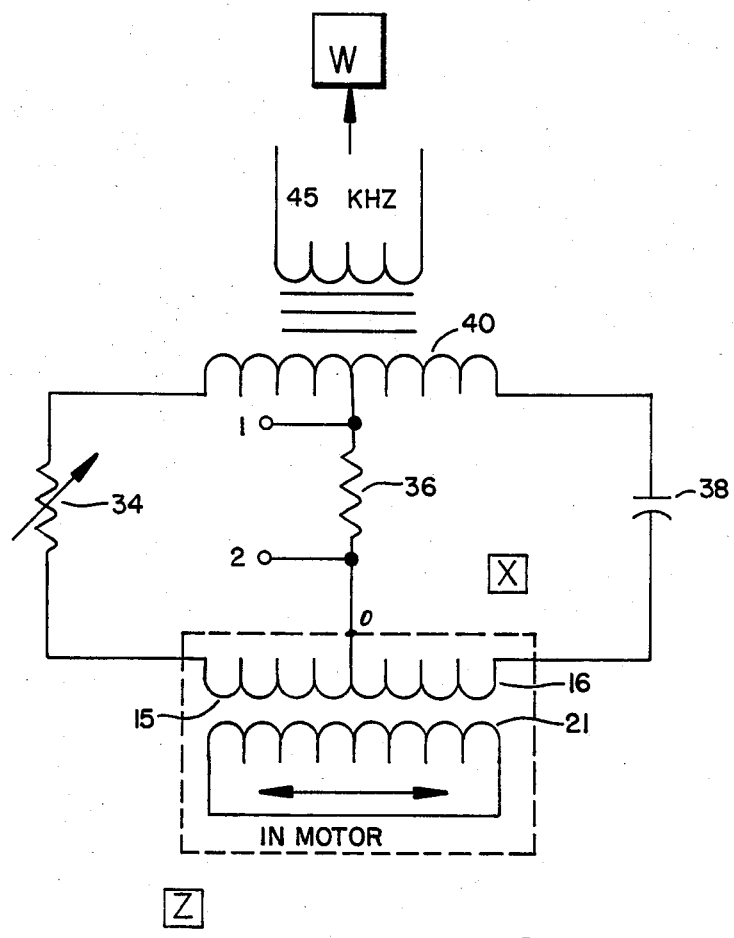
FIG. 2 is an electrical schematic of a means for sensing the position of the motor armature relative to the stator.
Figure 3:
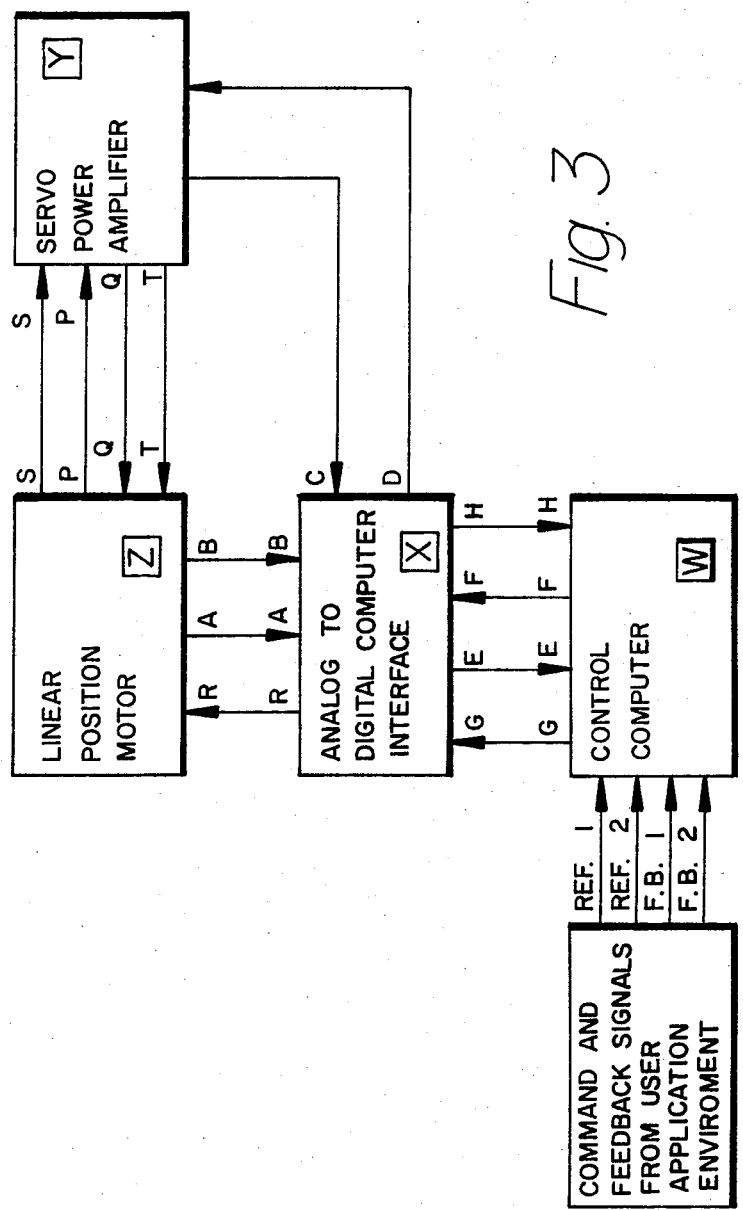
FIG. 3 is a system diagram of the servomotor in combination with the control, amplifier, and computer control means of an application environment simulation system.

In FIGS. 1 to 3, it is to be understood that the Letter X is used in connection with a sensing means which, as is more fully described below, also define an analog-to-digital computer interface. A processing or computer means is, in the drawings, referred to by Letter W. Additionally, a power amplifier and feedback means is referred to by Letter Y. Finally, the inventive servomotor, as a whole, is referred to by Letter Z.

In FIG. 1 appears an illustration of the servo amplifier and feedback areas of the servomotor system in relationship with the control system. More particularly, there is shown sensing an interface means which is electromagnetically coupled to the servomotor for monitoring the position of the armature 18 relative to zero reference positions "R" and "O". The sensing means 2 which is illustrated in more particular detail in FIG. 2, makes possible the conversion of positional data into an electronic signal that can be fed to feedback means X. The feedback means X will, through simple differentiation, translate position information into velocity information such that a processing means W, i.e., a control computer, will constantly be receiving information from sensing means regarding the position, velocity, force, current and voltage of the armature 18 of the servomotor Z and generating compensating control signals with regard to position, velocity and force.

It is to be understood that the generalized function of sensing and interface means 2X is to provide an output to processing means W which, responsive to a program corresponding to particular dynamic (or other) conditions, will generate a correction or control signal. This signal, after amplifying through power amp Y, acts to control the high frequency signal into excitation windings 15 and 16 (See FIG. 5) which, thereby, will control the high DC current through armature windings 20 and 21 and, thereby, will precisely control the movement of armatrue 18 relative to reference points "R" and "O". (See FIG. 1)

In FIG. 2 there is shown a circuit diagram of the sensing and interface means X by which the movement, velocity, force and electrical parameters of the armature are precisely monitored. More particularly, FIG. 2 shows a center tap coil symmetrically disposed about the zero reference point which separates excitation. There is further provided a variable resistor 34, a fixed resistor 36 and a capacitor 38 having a center tap transformer 40. The center tap transformer 40 actually comprises the front end of the processor which is continuously sensing the position and other analog data generated by the sensing and interface means from Motor Z. Analog processed data from Motor Z is continually passed from the analog computer and data conversion interface means to the control computer W.

The processing means picks signals off from Points 1 and 2, on either side of resistor 36, and feeds them into an analog-to-digital converter (not shown). The digital output thereof is converted into binary numbers of, for example, between 0 and 1,000 bits. These signals will be divided centrally about the binary point of 500 thus giving a negative signal of 500 bits below the desired reference position of the armature and of 500 bits in the opposite direction. Therefore, on a scale of 0 to 1,000 bits, bit 500 would represent the null point for a zero control signal such that no control or change of armature position, velocity or force would occur at bit 500. However, at any bit other than 500, the processing means W would generate a control signal to thereby cause the excitation windings 15 and 16 (See FIG. 5) to magnetically interact, either positively or negatively, and at a desired velocity and phase, to precisely control the parameters of the armature 18 relative to the stator. It is noted that the present servomotor Z is strictly closed-loop; that is, the motor Z always operates in conjunction with its control sub-systems W, X, and Y.

The present control system is employed with reference to a servomotor of the type shown in FIG. 5. Such a motor includes a hollow, tubular stator 10 having radially disposed throughout the shell of the stator a plurality of magnetically symmetric field magnets 12, each having its magnetic axis directed to the radial center 14 of said stator. The stator further comprises a plurality of symmetric, longitudinally disposed first feedback winding group 15 and second feedback winding group 16, the longitudinal extents thereof corresponding to the extent of change of linear position of the servomotor, said feedback windings comprising the secondary windings of the servomotor.

Radially within said stator is provided an elongate armature 18 having a radius smaller than the radius of said stator. Said Armature is longitudinally wound with first high current excitation winding group 20 and second high current excitation winding group 21, said excitation windings comprising the primary windings of the servomotor, the longitudinal length of said windings corresponding in length to at least the longitudinal length of said feedback windings 16 of said stator, wherein the difference in radii between said armature and said stator define an air gap. Current flowing through said excitation windings 20 and 21 will magnetically interact with said feedback windings 15 and 16 of the stator responsive to the character of the electrical input to said excitation windings.

Said feedback windings 15 and 16 will magnetically monitor motion and force of said armature relative to said stator to thereby carry a corrosponding motion and force feedback through said servoamplifier Y to thusly produce a corrected excitation signal to said excitation windings 20 and 21 to provide continuously corrected linear motion and force to said armature.

Schematically shown in FIG. 5 is the connection of the feedback windings to sensing means X which, in turn, interfaces with computing means W. Sensing means X monitors the position of armature 18 relative to the "O" reference position of FIGS. 1 and 2.

The interfaces of the motor Z with systems X and Y is shown in greater detail in the illustration of FIG. 3. In FIG. 3 is shown the various interfaces between the motor Z, the control computer W, the servo amplifier Y, and the computer interface X. In particular, the intra-system signal defined interfaces include the following:

Signal A: is a zero phase, voltage magnitude analog feedback signal, which passes from winding group 15 (See FIG. 5) to interface X.

Signal B: is a 180 degree phase voltage magnitude analog feedback signal, which passes from winding group 16 to interface X.

Signal C: is a linear current or force-torque analog feedback signal.

Signal D: is a voltage or velocity analog reference signal.

Signal E: is a digital signal from the data conversion computer interface X to the control computer W, providing a binary output from the computer interface representing a linear position of the armature in binary format.

Signal F: is a digital displacement signal, i.e., the signal that the computer is sending to the control windings (16), through the digital conversion and analog interface unit X thus telling the armature (18) what the degree of linear displacement within a given time frame is to be.

Signal G: is a digital offset reference point. The G signal will operate should the zero point begin to drift; this drifting will be sensed by the computer and will be compensated by signal G. In other words, computer Signal G keeps the electronic zero of the system in conformance with the "real world" through a zero offset of the sensed zero position shown in FIGS. 1 and 2.

Signal H: is a binary current feedback signal to computer W from the data conversion interface X and is a derivative of the signal C from the servo amplifier Y, this function communicates the instantaneous force that the servo motor is delivering to the load. It is, thereby, a current limit and force magnitude feedback.

Signal P: is an armature compensation. This compensation signal comes off of excitation windings 20 when, for whatever reason, the electromagnetic coupling between the primary and the secondary fails to create the desired current level within the armature, a condition generally resulting from nonlinearity of flux distribution in the armature air gap.

Signal Q: is a current source of Signal T to windings 20. Thereby, P may be viewed as the source of the armature compensation signal and S is the return of the same signal.

Signal R: is a position reference from the computer interface X to both windings groups 15 and 16 of Motor Z.

Signal S: is a part of the velocity compensation signal from the armature and, thereby, is related to signal T. It passes from excitation winding 20.

Signal T: provides current to excitation winding 20.

With further reference to FIG. 3, it is to be appreciated that into motor Z flow Signals Q, R and T; and out of motor Z flow Signals A, B, P and S.

With regard to computer interface X, Signals A, B, C, F and G flow thereinto, and out of computer interface X flow Signals D, E, H and R.

Into the amplifier Y flow Signals D, H, P and S. Out of amplifier Y flow Signals C, Q and T.

With reference to the lower left hand corner of FIG. 3, it may be noted that command feedback signals from the user application environment are inputted to the computer means W.

It is to be understood that, for economy in the internal operations of processing, the various signal inputs may be otherwise manipulated through both Boolean and non-Boolean functions to achieve whatever control program has been given to the processor. The force which the armature (18) of the present servo-motor Z can exert is arbitrarily in the range of 0 to 15 Lbs. Further control of the force of the armature can be accomplished through the use of a pressure transducer connected to the input of control computer W, more particularly to regulate force current Signal C.

It is to be appreciated that in the above-described system, the computing means W is continuously employing motor Signals A, B, P and S, passing these through an algorithm corresponding to a particularly fluidynamic (or other) situation and, therefrom, generating control output Signals Q, R and T to precisely control the position, velocity, and force of the armature within a given time frame. In that the frequency of the excitation current is, in a preferred embodiment, 45 kilohertz, the time domains in which the feedback control signals are generated will be very small. Thereby, a high degree of accuracy in operation and control of the armature will be obtained.

Figure 4:
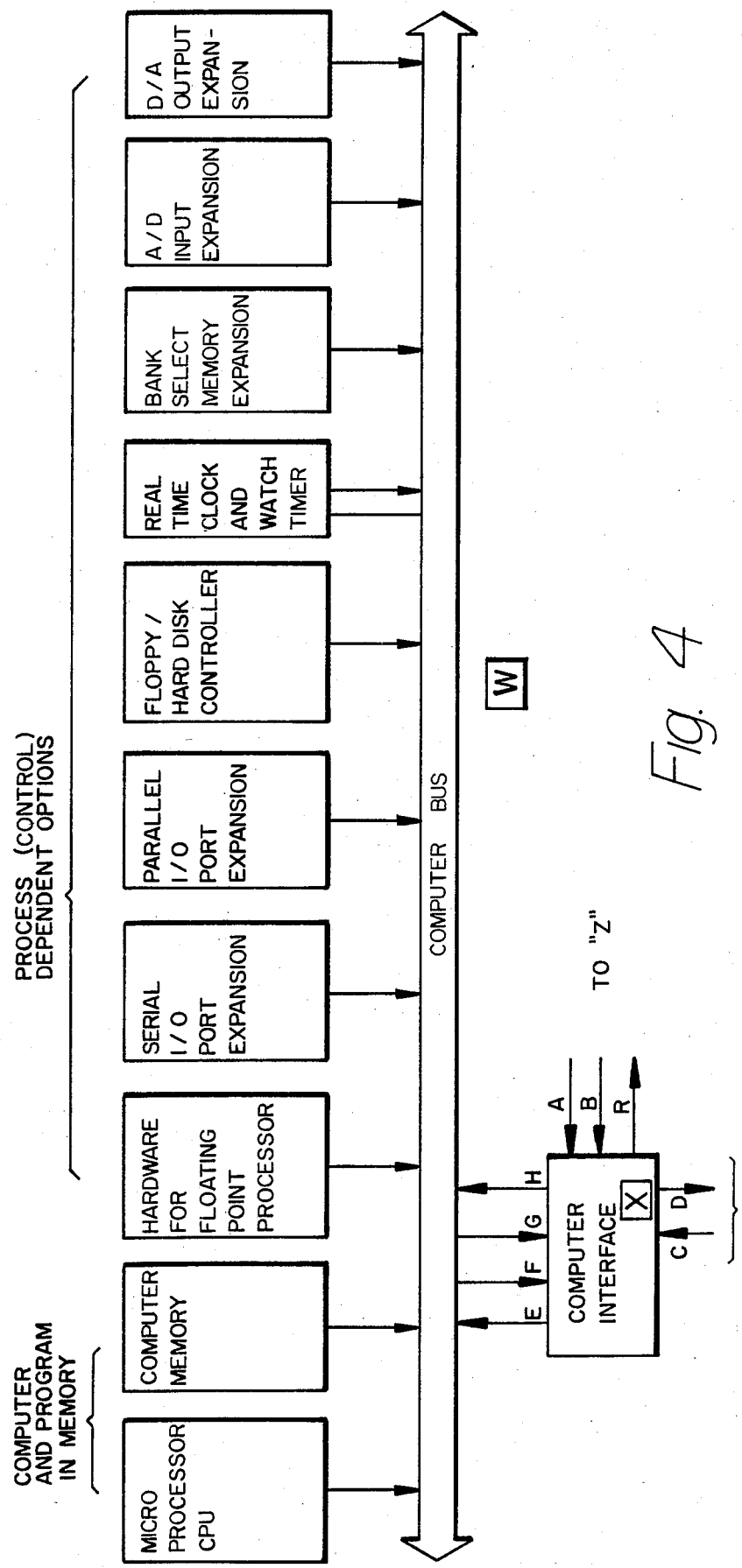
FIG. 4 is a systems view of the various computer interfaces of the system of FIG. 3.

The internal hardware of computer means W and its connection with computer interface X is shown in FIG. 4. The various hardware functions coming off the computer bus are shown. It is to be noted that the functions of FIG. 4 represent but one embodiment of a computing system suitable for control purposes of servomotor Z.

Shown, coming off the computer bus is a microprocessor CPU, a computer memory, hardware for floating point math, a serial input/output expander, parallel input/output point expanders, floppy/hard disk controller, a real-time clock watch-dog timer, and bank select memory expansion.

As shown in FIG. 4, Signals E, F, G and H all interact with computing means W. The controlling commands from computing means W are then transmitted to the motor Z in the form of Signals Q, R and T, while the interface X must receive Signals A, B, and C.

As above noted, the X-Z interface carries signals A, B and R (See FIGS. 3 and 5) which, respectively, generate zero phase and 180 degree phase voltage magnitudes and a computer generated armature-Position reference (Signal R).

Further shown in FIG. 5 is the connection of excitation winding group 20 to power amplifier Y, this being the Y-Z interface of FIG. 3. Across this interface are provided signals to said excitation windings to thereby effectuate a correction or control of the armature parameters relative to the stator position and other dynamic criteria.

As may be noted in FIG. 5, said excitation windings comprise first group 20 and second group 21, said first group disposed radially opposite said field magnets 12 and said second group disposed radially opposite said feedback windings 15 and 16, said first group defining, with said field magnets 12, a force control means, and said second group 21 defining, with said feedback windings 15 and 16 a motion control means. The force control means of group 20 and field magnets 12 permit the motor Z to respond to the torque current signal (Signal C) and the velocity compensation signal (signal S). The motion control means of group 11 and the feedback windings permit the motor Z to respond to the position reference signal (signal R) and voltage reference feedback signal (signal D).

Accordingly, while there have been shown and described the preferred embodiments of the present invention, it will be understood that the invention may be embodied otherwise than as herein specifically illustrated or described and that within said embodiments certain changes in the detail and construction, and the form and arrangement of the parts, may be made without departing from the underlying ideas or principles of this invention within the scope of the appended claims.

I claim:

1. A method for controlling a closed-loop linear position servo motor having an armature including a first group of excitation windings and a second group of excitation windings, and a stator including field magnets disposed radially opposite said first winding group, and feedback windings disposed radially opposite said second winding group, the method comprising the steps of:
    (a) applying a positional zero reference to said feedback windings, said zero reference correlating to a zero position of said armature;
    (b) monitoring time-dependent changes in the electromagnetic coupling between said feedback windings and said second armature winding group, relative to the coupling value of said zero reference;
    (c) translating said electromagnetic coupling changes of said Step (b) into a positional data signal; and
    (d) re-iteratively applying a compensation current to said second winding group to compensate the value of said electromagnetic coupling to thereby positionally regulate said armature in conformance with external command signals;

Contemporaneously with Steps (a) thru (d) above:
  (e) applying a reference current to said first armature winding group, said reference current corresponding to an armature coupling reference value and to an armature output force reference value;
  (f) monitoring time dependent changes in the electromagnetic coupling between said first armature winding group and said field magnets relative to said reference coupling value of Step (e) above;
  (g) translating electromagnetic coupling changes monitored in Step (f) above into a force data signal; and
  (h) re-iteratively applying a compensation current to said first winding group to compensate the value of said first group armature coupling to thereby regulate the positive and negative force of said armature in conformance with external command signals.

2. The method as recited in claim 1, further comprising the step of:
  re-iteratively differentiating said positional data signal of Step (c) above to thereby create a corresponding armature velocity signal.

3. The method as recited in claim 1, further comprising the step of:
  re-iteratively integrating said force data signal of Step (g) above to thereby form a corresponding armature velocity signal.

4. The method as cited in claim 1, further comprising the steps of:
  (i) converting said positional force and data signals of Steps (c) and (g) above into digital form;
  (j) digitally processing said external command signals; and
  (k) interfacing said digitally processed external command signals with said digitally converted armature position and force signals.

5. The method as recited in claim 4, further comprising of step of:
  (l) amplifying the inputs and outputs of said interfacing Step (k) above.

6. The method as recited in claim 4, further comprising the step of:
  (m) sensing, in real time, position, velocity, and force, time-dependent external data from a user application environment; and
  (n) interfacing the output of said sensing Step (m) to said digitally processing Step (j).

7. The method as recited in claim 6, further comprising the step of:
  (o) re-iteratively comparing said external data to references communicated from said command signal; and
  (p) from said comparing Step (o), generating correction signals for use by said reiteration Steps (d) and (h), whereby the position and force of said armature of said motor are continuously corrected responsive to variations, in external user environment data, relative to a management program.

8. The method as recited in claim 7 further comprising the step of:
  re-iteratively differentiating said positional data signal of Step (c) to thereby control the velocity of said armature.

9. The method as recited in claim 7 further comprising the step of:
  re-iteratively integrating said force data signal of Step (g) to thereby control the velocity of said armature.

* * * * *